United States Patent [19]

Bruckert et al.

[11] Patent Number: 5,235,614
[45] Date of Patent: Aug. 10, 1993

[54] METHOD AND APPARATUS FOR ACCOMMODATING A VARIABLE NUMBER OF COMMUNICATION CHANNELS IN A SPREAD SPECTRUM COMMUNICATION SYSTEM

[75] Inventors: Eugene J. Bruckert, Arlington Heights, Ill.; David D. Falconer, Nepean, Canada

[73] Assignee: Motorola, Inc., Schaumburg, Ill.

[21] Appl. No.: 844,943

[22] Filed: Mar. 2, 1992

Related U.S. Application Data

[63] Continuation of Ser. No. 669,134, Mar. 13, 1991, abandoned.

[51] Int. Cl.$^5$ .............................................. H04K 1/00
[52] U.S. Cl. ........................................ 375/1; 380/34; 370/18; 364/727
[58] Field of Search ....................... 380/31, 33, 34, 40, 380/46; 375/1, 38; 370/18; 364/727

[56] References Cited

U.S. PATENT DOCUMENTS

| | | | |
|---|---|---|---|
| 4,052,565 | 10/1977 | Baxter et al. | 375/1 X |
| 4,388,726 | 6/1983 | Dehaene | 364/727 X |
| 4,494,238 | 1/1985 | Groth, Jr. | 375/1 |
| 4,621,337 | 11/1986 | Cates et al. | 364/727 |
| 4,685,132 | 8/1987 | Bishop et al. | 380/46 |
| 4,901,307 | 2/1990 | Gilhousen et al. | |
| 4,930,140 | 5/1990 | Cripps et al. | 375/1 |
| 4,933,952 | 6/1990 | Albrieux et al. | 375/1 |
| 5,204,876 | 4/1993 | Buckert et al. | 375/1 |

OTHER PUBLICATIONS

"On the System Design Aspects of Code Division Multiple Access (CDMA) Applied to Digital Cellular and Personal Communication Networks", Allen Salmasi and Klein S. Gilhousen at the *41rd IEEE Vehicular Technology Conference*, May 19-22 1991 pp. 57-62.

"On the Capacity of a Cellular CDMA System", Klien Gilhousen, Irwin M. Jacobs, Roberto Padovani, Andrew Biterbi, Lindsay Weaver, Charles Wheatley, *IEEE Transactions on Vehicular Technology*, vol. 40, No. 2 (May 1991), pp. 303-312.

*Primary Examiner*—Tod R. Swann
*Attorney, Agent, or Firm*—Shawn B. Dempster

[57] ABSTRACT

A method and apparatus is provided for transmitting spread spectrum signals. The transmitter receives data symbols. Subsequently, the transmitter splits each particular set of two received data symbols into a first and second array of data symbols according to either of two algorithms. The first algorithm including providing both data symbols of the particular set to the first and second array of data symbols and the second algorithm including providing one of the data symbols of the particular set to the first array of data symbols and the other of the data symbols of the particular set to the second array of data symbols. Subsequently, the transmitter determines particular channels to transmit the first and second array of data symbols by spreading the first and second array of data symbols with a predetermined length Walsh code. The transmitter accommodates a variable number of data channels by selecting a particular algorithm from a group consisting essentially of a first algorithm and a second algorithm and setting the predetermined length Walsh code in response to the particular algorithm selected.

14 Claims, 1 Drawing Sheet

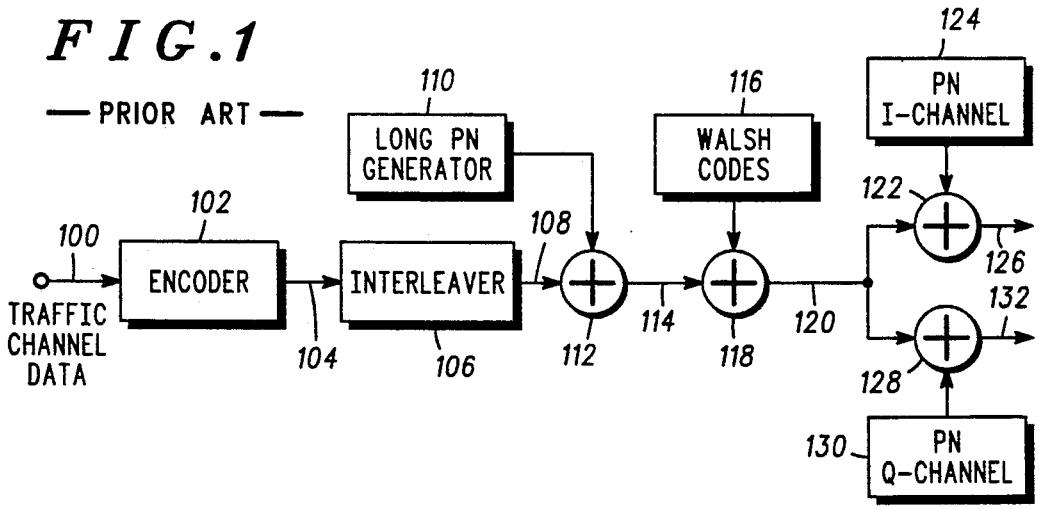
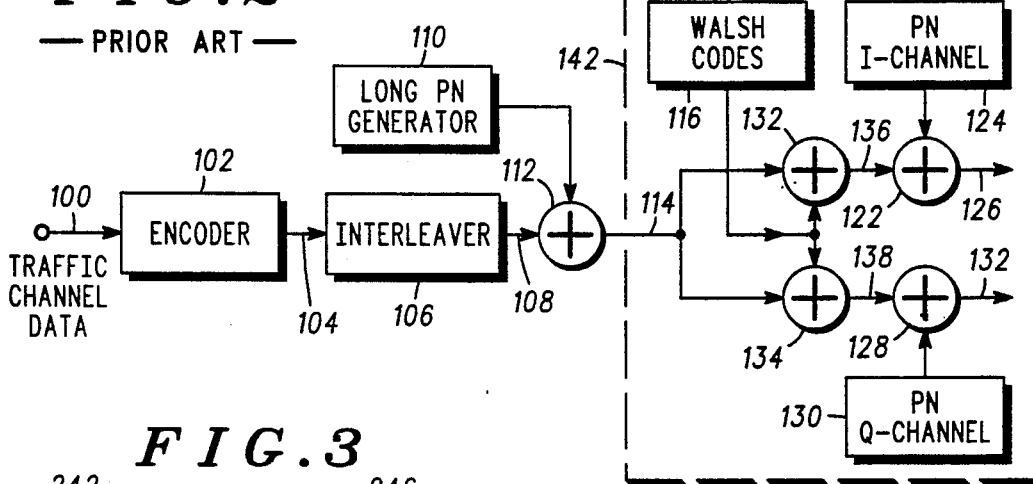
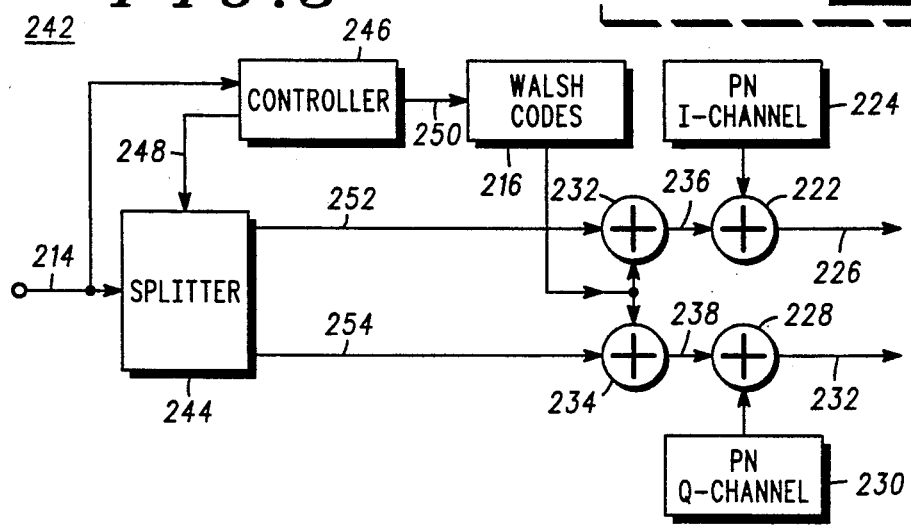

METHOD AND APPARATUS FOR ACCOMMODATING A VARIABLE NUMBER OF COMMUNICATION CHANNELS IN A SPREAD SPECTRUM COMMUNICATION SYSTEM

This is a continuation of application Ser. No. 07/669,134, filed Mar. 13, 1991 and now abandoned.

FIELD OF THE INVENTION

The present invention relates to communication systems which employ spread-spectrum signals and, more particularly, to a method and apparatus for providing high data rate traffic channels in a spread spectrum communication system.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Two types of two-way communication channels exist, namely, point-to-point channels and point-to-multipoint channels. Examples of point-to-point channels include wirelines (e.g., local telephone transmission), microwave links, and optical fibers. In contrast, point-to-multipoint channels provide a capability where many receiving stations may be reached simultaneously from a single transmitter (e.g. cellular radio telephone communication systems). These point-to-multipoint systems are also termed Multiple Access Systems (MAS).

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, improved security of communication through the use of encryption, and increased capacity.

These advantages are attained at the cost of increased system complexity. However, through the use of very large-scale integration (VLSI) technology, a cost-effective way of building the hardware has been developed.

To transmit a message signal (either analog or digital) over a band pass communication channel, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Correspondingly, the receiver is required to re-create the original message signal from a degraded version of the transmitted signal after propagation through the channel. The re-creation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several message sources over a common channel. Also, modulation may be used to convert the message signal into a form less susceptible to noise and interference.

For multiplexed communication systems, the system typically consists of many remote units (i.e. subscriber units) which require active service over a communication channel for a short or discrete intervals of time rather than continuous service on a communication channel at all times. Therefore, communication systems have been designed to incorporate the characteristic of communicating with many remote units for brief intervals of time on the same communication channel. These systems are termed multiple access communication systems.

One type of multiple access communication system is a spread spectrum system. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Three general types of spread spectrum communication techniques exist, including:

The modulation of a carrier by a digital code sequence whose bit rate is higher than the information signal bandwidth. Such systems are referred to as "direct sequence" modulated systems.

Carrier frequency shifting in discrete increments in a pattern dictated by a code sequence. These systems are called "frequency hoppers." The transmitter jumps from frequency to frequency within some predetermined set; the order of frequency usage is determined by a code sequence. Similarly "time hopping" and "time-frequency hopping" have times of transmission which are regulated by a code sequence.

Pulse-FM or "chirp" modulation in which a carrier is swept over a wide band during a given pulse interval.

Information (i.e. the message signal) can be embedded in the spectrum signal by several methods. One method is to add the information to the spreading code before it is used for spreading modulation. This technique can be used in direct sequence and frequency hopping systems. It will be noted that the information being sent must be in a digital form prior to adding it to the spreading code because the combination of the spreading code typically a binary code involves modulo-2 addition. Alternatively, the information or message signal may be used to modulate a carrier before spreading it.

Thus, a spread spectrum system must have two properties: (1) the transmitted bandwidth should be much greater than the bandwidth or rate of the information being sent and (2) some function other than the information being sent is employed to determine the resulting modulated channel bandwidth.

The essence of the spread spectrum communication involves the art of expanding the bandwidth of a signal, transmitting the expanded signal and recovering the desired signal by remapping the received spread spectrum into the original information bandwidth. Furthermore, in the process of carrying out this series of bandwidth trades, the purpose of spread spectrum techniques is to allow the system to deliver error-free information in a noisy signal environment.

Spread spectrum communication systems can be multiple access communication systems. One type of multiple access spread spectrum system is a code division multiple access (CDMA) system. In a CDMA system, communication between two communication units is accomplished by spreading each transmitted signal over the frequency band of the communication channel with a unique user spreading code. As a result, transmitted signals are in the same frequency band of the communication channel and are separated only by unique user spreading codes. Particular transmitted signals are retrieved from the communication channel by despreading a signal representative of the sum of signals in the communication channel with a user spreading code related to the particular transmitted signal which is to be retrieved from the communication channel. A CDMA system may use direct sequence or frequency hopping spreading techniques.

Many digital cellular telecommunication systems have the ability to provide reduced data rate channels. These systems have traffic channels designed to operate a particular data rate and also have reduced data rate traffic channels which provide more data channels than the designed data channels. However, in spread spectrum communication systems there is a need to address this problem of providing increased data channels.

SUMMARY OF THE INVENTION

A method and apparatus is provided for transmitting spread spectrum signals. The transmitter receives data symbols. Subsequently, the transmitter splits each particular set of two received data symbols into a first and second array of data symbols according to either of two algorithms. The first algorithm includes providing both data symbols of the particular set to the first and second array of data symbols and the second algorithm including providing one of the data symbols of the particular set to the first array of data symbols and the other of the data symbols of the particular set to the second array of data symbols. Subsequently, the transmitter determines particular channels to transmit the first and second array of data symbols by spreading the first and second array of data symbols with a predetermined length Walsh code. The transmitter accommodates a variable number of data channels by selecting a particular algorithm from a group consisting essentially of a first algorithm and a second algorithm and setting the predetermined length Walsh code in response to the particular algorithm selected.

BRIEF DESCRIPTION OF THE DRAWINGS

FIG. 1 is a diagram showing a prior art spread spectrum transmitter.

FIG. 2 is a diagram showing an alternative prior art spread spectrum transmitter equivalent to the spread spectrum transmitter shown in FIG. 1.

FIG. 3 is a diagram showing a preferred embodiment spread spectrum transmitter.

DETAILED DESCRIPTION

Referring now to FIG. 1, a prior art spread spectrum transmitter as substantially described in "On the System Design Aspects of Code Division Multiple Access (CDMA) Applied to Digital Cellular and Personal Communication Networks", Allen Salmasi and Klein S. Gilhousen, presented at the 41rd *IEEE Vehicular Technology Conference* on May 19–22, 1991 in St. Louis, Mo., pages 57–62 is shown. In the prior art spread spectrum transmitter, traffic channel data bits 100 are input to an encoder 102 at a particular bit rate (e.g., 9.6 kbit/s). The traffic channel data bits can include either voice converted to data by a vocoder, pure data, or a combination of the two types of data. Encoder 102 convolutionally encodes the input data bits 100 into data symbols at a fixed encoding rate. For example, encoder 102 encodes received data bits 100 at a fixed encoding rate of one data bit to two data symbols such that the encoder 102 outputs data symbols 104 at a 19.2 ksym/s rate. The encoder 102 accommodates the input of data bits 100 at variable rates by encoding repetition. That is, when the data bit rate is slower than the particular bit rate at which the encoder 102 is designed to operate, then the encoder 102 repeats the input data bits 100 such that the input data bits 100 are provided the encoding elements within the encoder 102 at the equivalent of the input data bit rate at which the encoding elements are designed to operate. Thus, the encoder 102 outputs data symbols 104 at the same fixed rate regardless of the rate at which data bits 100 are input to the encoder 102.

The data symbols 104 are then input into an interleaver 106. Interleaver 106 interleaves the input data symbols 104. The interleaved data symbols 108 are output by the interleaver 106 at the same data symbol rate that they were input (e.g., 19.2 ksym/s) to one input of an exclusive-OR combiner 112.

A long pseudo-noise (PN) generator 110 is operatively coupled to the other input of the exclusive-OR combiner 112 to enhance the security of the communication in the communication channel by scrambling the data symbols 108. The long PN generator 110 uses a long PN sequence to generate a user specific sequence of symbols or unique user spreading code at a fixed rate equal to the data symbol rate of the data symbols 108 which are input to the other input of the exclusive-OR gate 112 (e.g., 19.2 ksym/s). The scrambled data symbols 114 are output from the exclusive-OR combiner 112 at a fixed rate equal to the rate that the data symbols 108 are input to the exclusive-OR combiner 112 (e.g., 19.2 ksym/s) to one input of an exclusive-OR combiner 118.

A code division channel selection generator 116 provides a particular predetermined length Walsh code to the other input of the exclusive-OR combiner 118. The code division channel selection generator 116 can provide one of 64 orthogonal codes corresponding to 64

Walsh codes from a 64 by 64 Hadamard matrix wherein a Walsh code is a single row or column of the matrix. The exclusive-OR combiner 118 uses the particular Walsh code input by the code division channel generator 116 to spread the input scrambled data symbols 114 into Walsh code spread data symbols 120. The Walsh code spread data symbols 120 are output from the exclusive-OR combiner 118 at a fixed chip rate (e.g., 1.2288 Mchp/s).

The Walsh code spread data symbols 120 are provided to an input of two exclusive-OR combiners 122 and 128, respectively. A pair of short PN sequences (i.e. short when compared to the long PN sequence used by the long PN generator 110) are generated by I-channel PN generator 124 and Q-channel PN generator 130. These PN generators 124 and 130 may generate the same or different short PN sequences. The exclusive-OR combiners 122 and 128 further spread the input Walsh code spread data 120 with the short PN sequences generated by the PN I-channel generator 124 and PN Q-channel generator 130, respectively. The resulting I-channel code spread sequence 126 and Q-channel code spread sequence 132 are used to bi-phase modulate a quadrature pair of sinusoids by driving the power level controls of the pair of sinusoids. The sinusoids' output signals are summed, bandpass filtered, translated to an RF frequency, amplified, filtered and radiated by an antenna to complete transmission of the traffic channel data bits 100 in a communication channel.

Referring now to FIG. 2, the spread spectrum transmitter shown in FIG. 2 is an alternative prior art spread spectrum transmitter substantially equivalent to the spread spectrum transmitter shown in FIG. 1. The modulator portion 142 of the spread spectrum transmitter is shown in a form which is equivalent in function to the modulator portion shown in FIG. 1. In the alternative prior art spread spectrum transmitter, the scrambled data symbols 114 are output from the exclusive-OR combiner 112 at a fixed rate equal to the rate that the data symbols 108 are input to the exclusive-OR combiner 112 (e.g., 19.2 ksym/s) to one input of two exclusive-OR combiners 132 and 134, respectively.

A code division channel selection generator 116 provides a particular predetermined length Walsh code to the other input of both exclusive-OR combiners 132 and 134, respectively. The code division channel selection generator 116 can provide one of 64 orthogonal codes corresponding to 64 Walsh codes from a 64 by 64 Hadamard matrix wherein a Walsh code is a single row or column of the matrix. The exclusive-OR combiners 132 and 134 use the particular Walsh code input by the code division channel generator 116 to spread the input scrambled data symbols 114 into Walsh code spread data symbols 136 and 138, respectively. The Walsh code spread data symbols 136 and 138 are output from the exclusive-OR combiners 132 and 134, respectively, at a fixed chip rate (e.g., 1.2288 Mchp/s).

The Walsh code spread data symbols 136 and 138 are provided to inputs of two exclusive-OR combiners 122 and 128, respectively. Similar to the operation of prior art spread spectrum transmitter shown in FIG. 1, a pair of short PN sequences (i.e. short when compared to the long PN sequence used by the long PN generator 110) are generated by I-channel PN generator 124 and Q-channel PN generator 130. These PN generators 124 and 130 may generate the same or different short PN sequences. The exclusive-OR combiners 122 and 128 further spread the input Walsh code spread data 120 with the short PN sequences generated by the PN I-channel generator 124 and PN Q-channel generator 130, respectively. The resulting I-channel code spread sequence 126 and Q-channel code spread sequence 132 are used to bi-phase modulate a quadrature pair of sinusoids by driving the power level controls of the pair of sinusoids. The sinusoids' output signals are summed, bandpass filtered, translated to an RF frequency, amplified, filtered and radiated by an antenna to complete transmission of the traffic channel data bits 100 in a communication channel.

Referring now to FIG. 3, a preferred embodiment spread spectrum transmitter is shown which improves upon the prior art spread spectrum transmitter shown in FIG. 2. In the preferred embodiment spread spectrum transmitter, the number of data channels which are supported by the transmitter can be varied. A preferred embodiment modulator portion 242 of the spread spectrum transmitter is shown in FIG. 3. In the preferred embodiment modulator portion 242, the scrambled data symbols 214 are output from an exclusive-OR combiner similar to the exclusive-OR combiner 112 (shown in FIGS. 1 and 2) at a fixed rate equal to the rate that the data symbols are input to the exclusive-OR gate 112 (e.g., 19.2 ksym/s) to a splitter 244. Subsequently, the splitter 244 splits each particular set of two received data symbols into a first and second array of data symbols according to either of two algorithms. The first algorithm including providing both data symbols of the particular set to the first and second array of data symbols and the second algorithm including providing one of the data symbols of the particular set to the first array of data symbols and the other of the data symbols of the particular set to the second array of data symbols. The splitter 244 outputs the first array of data symbols 252 to an input of exclusive-OR combiner 232 and outputs the second array of data symbols 254 to an input of exclusive-OR combiner 234.

A code division channel selection generator 216 provides a particular predetermined length Walsh code to the other input of both exclusive-OR combiners 232 and 234, respectively. The code division channel selection generator 216 can provide one of 64 orthogonal codes corresponding to 64 Walsh codes from a 64 by 64 Hadamard matrix wherein a Walsh code is a single row or column of the matrix. The exclusive-OR combiners 232 and 234 use the particular Walsh code input by the code division channel generator 216 to spread the input scrambled data symbols 214 into Walsh code spread data symbols 236 and 238, respectively. The Walsh code spread data symbols 236 and 238 are output from the exclusive-OR combiners 232 and 234, respectively, at a fixed chip rate (e.g., 1.2288 Mchp/s).

The Walsh code spread data symbols 236 and 238 are provided to inputs of two exclusive-OR combiners 222 and 228, respectively. Similar to the operation of prior art spread spectrum transmitter shown in FIGS. 1 and 2, a pair of short PN sequences (i.e. short when compared to the long PN sequence used by a long PN generator similar to the long PN generator used in FIGS. 1 and 2) are generated by I-channel PN generator 224 and Q-channel PN generator 230. These PN generators 224 and 230 may generate the same or different short PN sequences. The exclusive-OR combiners 222 and 228 further spread the input Walsh code spread data 236 and 238 with the short PN sequences generated by the PN I-channel generator 224 and PN Q-channel generator 230, respectively. The resulting I-channel code spread sequence 226 and Q-channel code spread sequence 232 are used to bi-phase modulate a quadrature pair of sinusoids by driving the power level controls of the pair of sinusoids. The sinusoids' output signals are summed, bandpass filtered, translated to an RF frequency, amplified, filtered and radiated by an antenna to complete transmission of the traffic channel data bits original input to the preferred embodiment spread spectrum transmitter.

The preferred embodiment transmitter accommodates a variable number of data channels by utilizing a controller 246 to control splitter 244 and code division channel selection generator 216. The controller 246 accommodates the variable number of data channels by sending a signal 248 to splitter 244 to select either the first algorithm or the second algorithm for the splitter 244 to implement. In addition to the controller 246 sending a signal 248 to the splitter 244, controller 246 sends a signal 250 to channel division selection generator 216 to adjust the predetermined length of the Walsh codes to be used by the modulator. Higher numbers of data channels can be accommodated within a spread spectrum system such as one based on the use of 64 symbol length Walsh codes by allowing a higher order Walsh code (e.g., 128 bit length Walsh codes) to operate along with the 64 bit length Walsh codes. In the preferred embodiment transmitter, the essential notion for providing a higher number of data channels is to divide a 64 bit length Walsh code into two 128 bit length Walsh codes while maintaining orthogonality between all of the Walsh codes used. This is accomplished by prohibiting the use of the 64 bit length Walsh code (or maximum length Walsh code for this preferred embodiment spread spectrum transmitter) that was divided into two 128 bit length Walsh codes. Thus, when the splitter 244 is implementing the first algorithm, controller 246 sends a signal 250 to channel division selection generator 216 to adjust the predetermined length of the Walsh codes to 64 bits and when the splitter 244 is implementing the second algorithm, controller 246 sends a signal 250 to channel division selection generator 216 to adjust the predetermined length of the Walsh codes to 128 bits.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A spread spectrum channel apparatus, comprising:
   (a) splitter means for accommodating a variable number of data channels by splitting each particular set of two received data symbols into a first and second array of data symbols in accordance with a particular algorithm selected from the group consisting essentially of a first algorithm and a second algorithm, the splitter means comprising means for implementing the first algorithm by providing both data symbols of the particular set to the first and second array of data symbols, the splitter means further comprising means for implementing the second algorithm by providing one of the data symbols of the particular set to the first array of data symbols and the other of the data symbols of the particular set to the second array of data symbols; and
   (b) code division channel coding means, operatively coupled to the splitter means, for determining particular channels to transmit the first and second array of data symbols by spreading the first and second array of data symbols with a predetermined length spreading code, the predetermined length of the spreading code being set in response to the particular splitting algorithm selected.

2. The spread spectrum channel apparatus of claim 1 further comprising scrambling means, operatively coupled to the splitting means, for scrambling the data symbols with a user pseudo noise spreading code provided by a user code generator prior to input into the splitting means.

3. The spread spectrum channel apparatus of claim 1 further comprising a spreading means, operatively coupled to the code division channel coding means, for preparing the spread first and second array of data symbols for subsequent input to a modulator by further spreading the spread first and second array of data symbols with at least one pseudo noise site identification code.

4. The spread spectrum channel apparatus of claim 1 wherein:
   (a) the spreading code comprises a Walsh code; and
   (b) the code division channel coding means comprises means for limiting the number of Walsh codes used by the code division channel means when a higher than maximum length Walsh code is used such that orthogonality of the maximum length Walsh codes is maintained with respect to the higher than maximum length Walsh code.

5. The spread spectrum channel apparatus of claim 1 further comprising a transmitting means, operatively coupled to the code division channel means, for transmitting the spread first and second array of data symbols over a communication channel.

6. The spread spectrum channel apparatus of claim 5 further comprising:
   (a) code division channel decoding means for sampling a signal received from over the communication channel into a first and second array of data samples by despreading the received signal with a predetermined length spreading code, the predetermined length of the spreading code being set in response to the particular splitting algorithm selected prior to transmission of the received signal; and
   (b) combiner means, operatively coupled to the code division channel decoding means, for accommodating a variable number of data channels by combining the first and second array of data samples into a stream of received data samples in accordance with a particular algorithm selected from the group consisting essentially of a first algorithm and a second algorithm, the combiner means comprising means for implementing the first algorithm by combining a data sample of the first array of data samples and a data sample of the second array of data samples into a combined data sample and subsequently including the combined data sample in the stream of received data samples, the combiner means further comprising means for implementing the second algorithm by including a data sample of the first array of data samples in the stream of received data samples and including a data sample of the second array of data samples in the stream of received data samples.

7. A method of communicating a spread spectrum signal, comprising:
   (a) accommodating a variable number of data channels by splitting each particular set of two received data symbols into a first and second array of data symbols by providing both data symbols of the particular set to the first and second array of data symbols, if a first algorithm is selected;
   (b) accommodating a variable number of data channels by splitting each particular set of two received data symbols into a first and second array of data symbols by providing one of the data symbols of the particular set to the first array of data symbols and the other of the data symbols of the particular set to the second array of data symbols, if a second algorithm is selected; and
   (c) determining particular channels to transmit the first and second array of data symbols by spreading the first and second array of data symbols with a predetermined length spreading code, the predetermined length of the spreading code being set in response to the particular splitting algorithm selected.

8. The method of claim 7 further comprising the step of scrambling the data symbols with a user pseudo noise spreading code prior to either step of splitting.

9. The method of claim 7 further comprising the step of preparing the spread data symbols for subsequent input to a modulator by further spreading the spread data symbols with at least one pseudo noise site identification code.

10. The method of claim 7 wherein the spreading code comprises a Walsh code and further comprising the step of limiting the number of Walsh codes used in the step of determining particular channels when a higher than maximum length Walsh code is used such that orthogonality of the maximum length Walsh codes is maintained with respect to the higher than maximum length Walsh code.

11. The method of claim 7 further comprising the step of transmitting the spread first and second array of data symbols over a communication channel.

12. The method of claim 11 further comprising the steps of:
   (a) sampling a signal received from over the communication channel into a first and second array of data samples by despreading the received signal with a predetermined length spreading code, the predetermined length of the spreading code being set in response to the particular splitting algorithm selected prior to transmission of the received signal; and
   (b) combining the first and second array of data samples into a stream of received data samples in accordance with a particular algorithm selected from the group consisting essentially of a first algorithm and a second algorithm, the first algorithm comprising combining a data sample of the first array of data samples and a data sample of the second array of data samples into a combined data sample and subsequently including the combined data sample in the stream of received data samples, the second algorithm comprising including a data sample of the first array of data samples in the stream of received data samples and including a data sample of the second array of data samples in the stream of received data samples.

13. A method of communicating a spread spectrum signal, comprising
   (a) sampling a signal received from over the communication channel into a first and second array of data samples by despreading the received signal with a predetermined length spreading code, the received signal comprising spread data symbols from a first and a second array of data symbols wherein the first and second array of data symbols are formed from particular sets of two data symbols in accordance with a particular splitting algorithm selected from the group consisting essentially of a first algorithm and a second algorithm, the first algorithm comprising providing both data symbols of the particular set to the first and second array of data symbols, the second algorithm comprising providing one of the data symbols of the particular set to the first array of data symbols and the other of the data symbols of the particular set to the second array of data symbols, the spread data symbols being spread by the predetermined length spreading code, the predetermined length of the spreading code being set in response to the particular splitting algorithm selected; and
   (b) accommodating a variable number of data channels by combining the first and second array of data samples into a stream of received data samples in accordance with a particular algorithm selected from the group consisting essentially of a first algorithm and a second algorithm, the first algorithm comprising combining a data sample of the first array of data samples and a data sample of the second array of data samples into a combined data sample and subsequently including the combined data sample in the stream of received data samples, the second algorithm comprising including a data sample of the first array of data samples in the stream of received data samples and including a data sample of the second array of data samples in the stream of received data samples.

14. A spread spectrum channel apparatus, comprising
   (a) code division channel decoding means for sampling a signal received from over the communication channel into a first and second array of data samples by despreading the received signal with a predetermined length spreading code, the received signal comprising spread data symbols from a first and a second array of data symbols wherein the first and second array of data symbols are formed from particular sets of two data symbols in accordance with a particular splitting algorithm selected from the group consisting essentially of a first algorithm and a second algorithm, the first algorithm comprising providing both data symbols of the particular set to the first and second array of data symbols, the second algorithm comprising providing one of the data symbols of the particular set to the first array of data symbols and the other of the data symbols of the particular set to the second array of data symbols, the spread data symbols being spread by the predetermined length spreading code, the predetermined length of the spreading code being set in response to the particular splitting algorithm selected; and
   (b) combiner means, operatively coupled to the code division channel decoding means, for accommodating a variable number of data channels by combining the first and second array of data samples into a stream of received data samples in accordance with a particular algorithm selected from the group consisting essentially of a first algorithm and a second algorithm, the combiner means comprising means for implementing the first algorithm by combining a data sample of the first array of data samples and a data sample of the second array of data samples into a combined data sample and subsequently including the combined data sample in the stream of received data samples, the combiner means further comprising means for implementing the second algorithm by including a data sample of the first array of data samples in the stream of received data samples and including a data sample of the second array of data samples in the stream of received data samples.

* * * * *